United States Patent [19]

Haag

[11] 4,348,093
[45] Sep. 7, 1982

[54] INTER-LENS SHUTTER

[76] Inventor: Edmund Haag, Technischer Angestellter, Talwiesenstrasse 26, 7546 Enzklosterle, Nonnenmiss, Fed. Rep. of Germany

[21] Appl. No.: 294,703

[22] Filed: Aug. 20, 1981

[30] Foreign Application Priority Data

Aug. 30, 1980 [DE] Fed. Rep. of Germany ....... 3032760

[51] Int. Cl.³ .............................................. G03B 9/22
[52] U.S. Cl. ................................... 354/233; 354/264; 354/274
[58] Field of Search ................ 354/233, 274, 228–230, 354/226, 250, 270–272, 261–265

[56] References Cited

U.S. PATENT DOCUMENTS 2,269,400 1/1942 Steiner ................................. 354/233

FOREIGN PATENT DOCUMENTS 597378 5/1934 Fed. Rep. of Germany ...... 354/261

Primary Examiner—John Gonzales

[57] ABSTRACT

An inter-lens shutter having an opening and closing system comprised of a plurality of, e.g. at least five, successively overlapping segments which are disposed so that they reciprocate between an open and a closed shutter position, two of the segments having corresponding angled tip stabilizer portions which extend laterally to the plane of movement of the reciprocating segments, the first of the two segments having an angled tip stabilizer portion being selectively disposed behind the first or frontmost segment and the second of the two segments having an angled tip stabilizer portion being selectively disposed behind the fourth successive segment, whereby such arrangement prevents collisions between the various segments during their closing and opening movements.

5 Claims, 3 Drawing Figures

U.S. Patent  Sep. 7, 1982  4,348,093
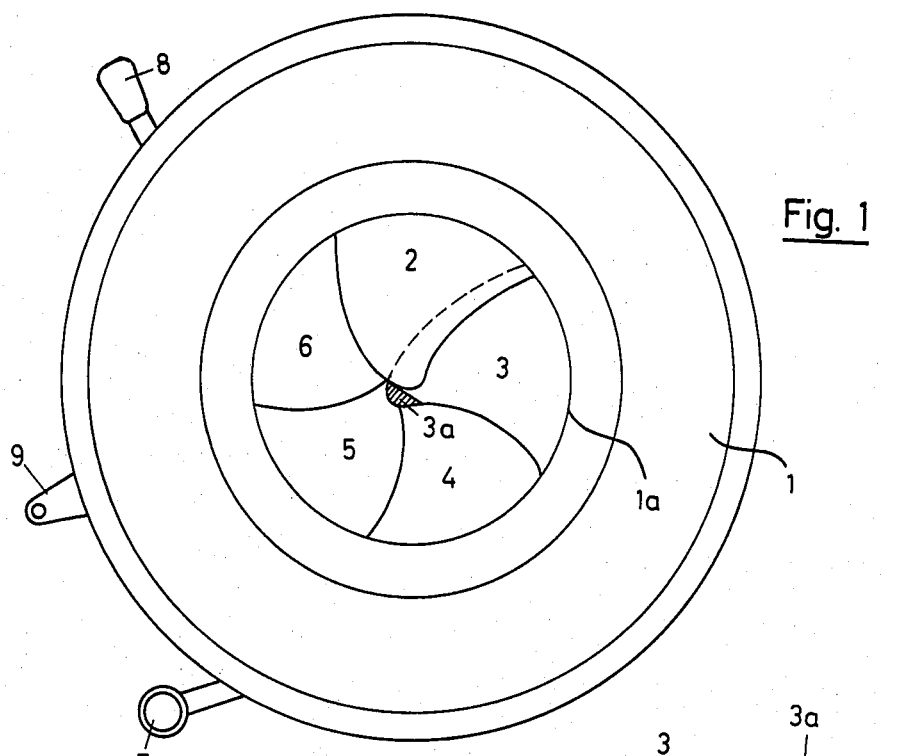
Fig. 1
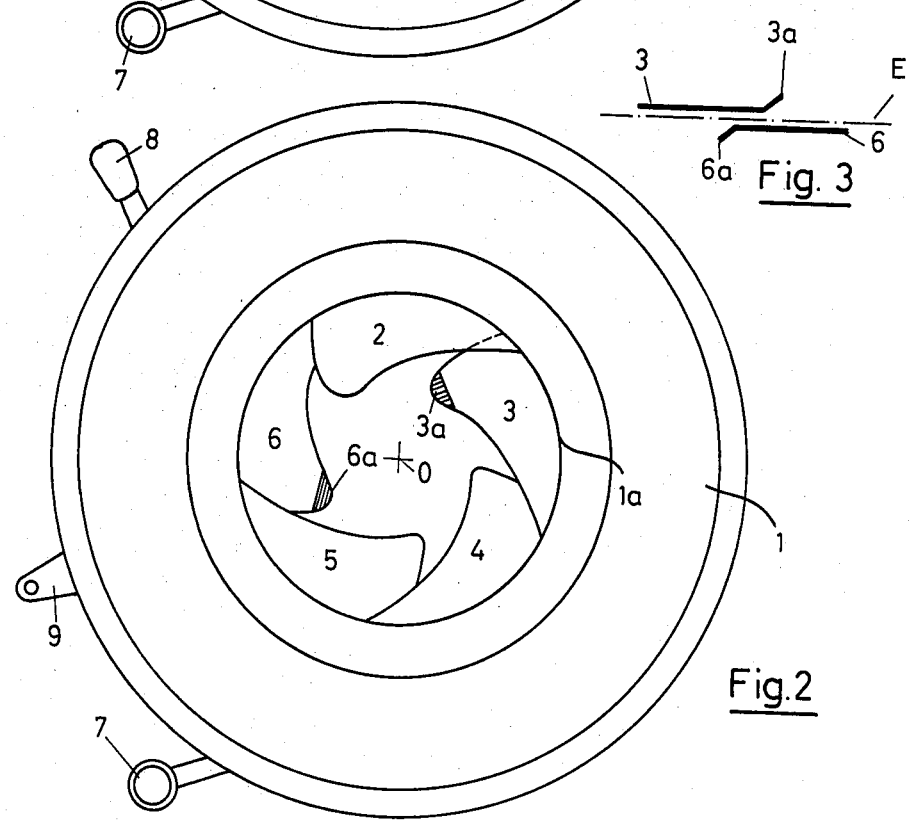
Fig. 2
Fig. 3

INTER-LENS SHUTTER

The present invention relates to a photographic interlens shutter whose opening and closing shutter system is formed from a plurality of successively overlapping shutter segments, preferably five, which are disposed so that they reciprocate backwards and forwards, two of such segments being selectively provided on the outer ends thereof which overlap in the closed shutter position with a corresponding angled portion which extends laterally to the plane of reciprocal movement of the segments.

In the case of known shutters of the above type having five shutter segments, two of the successively overlapping shutter segments, namely the first or frontmost one and the last or rearmost one, have hitherto each been provided at their outer end or tip with an angled portion to guide the particular segment when it enters the overlapping phase, on the assumption that this feature eliminates the risk of a collision between these segments and the other segments interleaved therebetween. It is well recognized in shutter arrangements of this type that the shutter segments are very much inclined to "dangle", especially those segments which when actuated to open position for opening the light passage recede into a relatively narrow annular chamber in the shutter housing and consequently have to have a relatively high degree of slimness. More specially, when such segments are actuated from the open position and enter the overlapping phase during return to the closed position, they normally require guidance if it is desired to insure a trouble-free operation and minimize such "dangling."

Contrary to the assumption, generally prevalent in technical circles, that the above-described specific angled tip feature can prevent the shutter segments from colliding, it has been found in practice time and again with shutters having shutter segment systems of the above-described type, that the second successive segment and the fourth successive segment, which both move diametrically towards one another before and during entry into the overlapping region for closing the shutter segment system, still in fact collide with each other because, as has been recognized, the contemplated reciprocal guidance of these two end position successive segments by the segments located therebetween has proved to be inadequate.

It is among the objects and advantages of the present invention to overcome the foregoing drawback and deficiency of the prior art, and to provide an arrangement for a shutter of the initially mentioned type whereby collisions between the successively overlapping shutter segments may be prevented with absolute certainty.

Other and further objects and advantages of the present invention will become apparent from a study of the within specification and accompanying drawings, in which:

FIG. 1 is a schematic front view of an inter-lens shutter according to the present invention when the opening and closing shutter segment system is closed, FIG. 2 is a schematic view which shows the shutter of FIG. 1 when the opening and closing system is half open, and FIG. 3 is a schematic partial view of the second and fifth segments of the shutter of FIG. 1, relative to the plane of reciprocal movement, indicated by a chain-dotted line, of the other remaining segments of the shutter.

According to the present invention, an inter-lens shutter, or between the lens shutter, arrangement for a camera is advantageously provided, whose opening and closing system is formed from a plurality of successively overlapping shutter segments which are disposed so that they reciprocate backwards and forwards, two of such segments being provided, on their outer ends which overlap in the closed position, with an angled portion or stabilizer portion which extends laterally to the plane of reciprocal movement of the segments, whereby to form two corresponding stabilizer segments, the first such stabilizer segment, i.e. having an angled portion, being selectively disposed after the first or frontmost segment viewed in the direction of the optical axis from the exterior to the interior of the shutter, and the second such stabilizer segment, i.e. having an angled portion, being selectively disposed after the fourth successive segment in the series.

Significantly, with an opening and closing shutter system according to the present invention, e.g. a system which comprises a total of five segments, collisions between the selectively disposed successive segments cannot occur.

Specifically, such collisions are avoided because, in the above discussed critical overlapping phase of movement, the tip of the first successive segment is slidably raised by means of the angled portion or stabilizer portion of the second successive or stabilizer segment into a plane of movement which fundamentally excludes reciprocal contact between this first segment, i.e. which is located at the front in the direction of the incidence of light, and the more or less diametrically opposing third and fourth successive segments, i.e. which are located behind the second successive or stabilizer segment in the direction of the incidence of light.

Moreover, such collisions are also avoided because selectively the second successive segment, for its part, is provided with such angled portion, i.e. an "angled deflector portion", along with the fifth such segment.

In this regard, in a preferred modification of the present invention, the angled portion or stabilizer portion is disposed on the second successive segment in such a manner that, although this segment is not the first or frontmost segment, i.e. an "external segment", the light density of the opening and closing system is insured at the end of the movement phase of the segments, i.e. in their end position of rest.

Referring to the drawings, a housing 1 of an inter-lens shutter according to the present invention is shown, whose opening and closing shutter system comprises a total of five successively overlapping segments 2 to 6. These segments 2 to 6, which are fixedly pivotally mounted in a manner, known per se, on a base plate located in the housing 1 and which are brought into reciprocal driving engagement with a drive ring (not shown) which is disposed coaxially with the optical axis 0 or correspondingly with the exposure aperture 1a, are associated with one another in ordinal sequence in the direction of the incidence of light, so that they partially overlap in the closed position, i.e. in the vicinity of their outer ends.

FIG. 1 shows the first segment 2 located at the front, viewed in the direction of the incidence of light, with the remaining segments located therebehind in successive ordinal sequence. Of these five segments, selectively the second successive segment 3, which follows the first or frontmost segment 2, is provided with an angled portion or angled deflector portion or angled tip stabilizer portion 3a, which is bent forwardly from the reciprocal segment movement plane E, and also selectively the segment 6, which is the rearmost segment is provided with such an angled portion 6a, but which is bent in the opposite direction.

This relationship can more clearly be seen from FIG. 3, which shows only the corresponding opposing arrangement of the two angled portion segments 3 and 6 for clarity of illustration. Thus, the angled portion 3a of the first stabilizer segment 3 extends in a direction angularly toward the frontmost segment 2 and the angled portion 6a of the second stabilizer segment 6 extends in an opposite direction angularly away from the fourth successive segment 5.

It can also be seen from the views shown in FIGS. 1 and 2, that the inter-lens shutter is provided in the usual manner with a cocking lever 7, a release lever 8, and an adjusting lever 9 for the manual operation of the opening and closing shutter system, and that in fact no more than two segments, not provided with an angled portion, are immediately adjacent to one another in the successive ordinal sequence of the overlapping segments of the system.

Thus, in an unexpected manner which does not require any additional expenditure compared with the analogous known segment systems, an arrangement is provided in which, i.e. in any horizontal, vertical or angular spatial disposition of the shutter, a collision cannot occur during the critical phase of closing movement, i.e. when the segments 2 to 6 enter the overlapping phase from the open shutter position through the half open position (FIG. 2) to the closed shutter position (FIG. 1). This is because the first segment 2 is so guided and stabilized by the selective second, angled portion or stabilizer segment 3, or correspondingly is, of necessity, slidably raised thereby so far out of its "normal" plane of reciprocal movement that it cannot collide with either the third segment 4 or the fourth segment 5 respectively, as had occurred in the past with the analogous known arrangements.

Thus, the risk of a collision between the second or angled portion segment 3 and either the third segment 4 or the fourth segment 5 respectively is obviated with the required certainty by the "angled deflector portion" of the segment 3.

Furthermore, the angled tip of the outer end portion of the second segment 3 is preferably designed and angled, i.e. sized and shaped relative to the flat tip of the outer end portion of the first segment 2, such that as shown in FIG. 1, the first segment 2 in the closed position of the segments is positively light tight, i.e. lies fully on or overlies on the second or stabilizer segment 3 which is provided with such angled portion 3a in a light-tight manner.

It will be appreciated that the foregoing specification and accompanying drawings are set forth by way of illustration and not limitation, and that various modifications and changes may be made therein without departing from the spirit and scope of the present invention which is to be limited solely by the scope of the appended claims.

What is claimed is:

1. Photograpic inter-lens shutter in which the opening and closure system is formed of a plurality of oscillating segments which are successively overlappingly arranged in ordinal sequence viewed in the direction of the optical axis and disposed for reciprocating backwards and forwards in a plane of movement between an open shutter position and a closed shutter position, and having outer ends which overlap in a closed position, in which two of the segments are provided as stabilizer segments having, on their outer ends which overlap in the closed position, a corresponding angled portion which extends substantially laterally to the plane of movement of the segments, the first stabilizer segment having such angled portion being disposed after the frontmost successive segment viewed in the direction of the optical axis and the second stabilizer segment having such angled portion being disposed after the fourth successive segment.

2. Arrangment according to claim 1 wherein the angled portion of the first stabilizer segment is sized and shaped relative to the size and shape of the frontmost successive segment such that the frontmost segment overlies on the first stabilizer segment in a light tight manner when the shutter segments are in the closed position.

3. Arrangement according to claim 2 wherein the opening and closing system is formed of five shutter segments.

4. Arrangement according to claim 1 wherein the opening and closing system is formed of five shutter segments.

5. Arrangement according to claim 1 wherein the angled portion of the first stabilizer segment extends in a direction angularly toward the frontmost segment and the angled portion of the second stabilizer segment extends in an opposite direction angularly away from the fourth successive segment.

* * * * *